Patented Dec. 20, 1938

2,140,781

UNITED STATES PATENT OFFICE 2,140,781

TREATMENT OF MEATS WITH PROTEOLYTIC ENZYMES

Hugh E. Allen, Evanston, Ill., assignor of one-half to Albert G. McCaleb, Evanston, Ill.

No Drawing. Application September 25, 1937, Serial No. 165,687

6 Claims. (Cl. 99—107)

My invention concerns the treatment of meats, to make them tender and easily assimilable, with proteolytic enzymes, e. g., the enzymes of papain (papayotin) derived from the partially ripe fruit or leaves of the tropical papaw tree (*Carica papya*).

The object of the invention is to control enzyme effected proteolysis in such manner that the treated meats are rendered tender and easily assimilable without being otherwise modified so as to be disagreeable to sight, touch, taste or smell.

Heretofore the tenderizing of tough meats by the application thereto of proteolytic enzymes has been accompanied by other modifications of the meat which have been very undesirable. Consider, for example, a fresh, red, firm cut of round steak of beef which, in order to alleviate its natural toughness, has been treated with papain (either dry or in solution). In a short time the meat becomes very tender, and so remains after it is cooked. But, at the same time, the meat undergoes other and undesirable changes,—all of which are very noticeable while the meat is still raw, and some of which are accentuated when the meat is cooked. The meat loses its characteristic dark red color,—takes on a pale shade like that of young veal or pork. The meat lacks the firmness which is expected in fresh meat from a healthy ox,—evidences the yielding, flabby characteristic of meat which is partially putrified, or which has come from the carcass of an unhealthy animal. Moreover, the flavor and aroma of the meat are objectionably affected by the digestive (decomposing) action of the uncontrolled enzymes. Therefore, papain, as a meat tenderizer, has never been popular among civilized people, notwithstanding that its meat tenderizing action has been known for many generations.

I have discovered that the benefits of the meat tenderizing action of proteolytic enzymes may be realized, without experiencing the heretofore concomitant disagreeable results above mentioned, if the enzymes are required to exercise their influence upon the meat in the presence of a controlling agent in the form of a salt of an amino acid,—mono-sodium glutamate being the preferred controlling agent.

I may tenderize meats according to the present invention with a material which comprises, as its two essentials, papain and mono-sodium glutamate,—these essential materials being intermixed with a suitable diluent, or diluents, such, for example, as common salt, sucrose, and tri-calcium phosphate. The weight of the papain in the material preferably is equal to from fifty per cent (50%) to one hundred per cent (100%) of the weight of the mono-sodium glutamate.

A preferred formula (in which the given percentages are by weight) for a material wherewith the objects of the present invention may be realized, is as follows:

|  | Per cent |
|---|---|
| Papain | 5 to 10 |
| Mono-sodium glutamate | 10 |
| Sucrose (desirably anhydrous corn sugar) | 20 |
| Tri-calcium phosphate | 1 to 2 |
| Common salt (extra fine) | The remainder. |

These ingredients are preferably thoroughly intermixed in a power driven mixer.

The resultant material, when used in the dry form, is sprinkled or otherwise distributed over the exterior surfaces of steaks or other meat chunks to be tenderized. Trial will demonstrate the minimum quantity of the material necessary suitably to tenderize a steak or other meat chunk of given size, weight and thickness. If such minimum quantity is exceeded there will be no serious consequences, so far as the condition of the meat is concerned, due to the control which the mono-sodium glutamate exercises over the enzymes. The latter are permitted to tenderize all tough portions of the meat, but are not permitted to proceed further with their digestive (decomposing) functions.

All initially tender and all enzyme tenderized portions of the meat appear to be shielded, by the mono-sodium glutamate, from objectionable digestive (decomposing) action on the part of the enzymes. I believe that this phenomenon may be explained as follows: Mono-sodium glutamate, although not a potent curing salt, is capable of reacting, somewhat like a potent curing salt, with meat protein when the latter is very tender. See Allen and McCaleb Patent No. 2,021,621, dated November 19, 1935, wherein is recorded the discovery that the very tender protein constituent of animal blood can be effectively cured with mono-sodium glutamate. Apparently mono-sodium glutamate is incapable of any reaction, or any significant reaction, with tough meat, but does have the faculty, in the circumstances herein discussed, of reacting with very tender meat (whether initially tender or enzyme tenderized) to thwart undesirable digestive decomposition of such tender meat by proteolytic enzymes.

The meat treating material hereinbefore described is not necessarily used in its dry form. It may be dissolved in water or other liquid to form a solution which can be applied to the exterior surfaces of the meat, e. g., as with a brush, or it may be injected, as with a syringe, into meat chunks to be tenderized. In some instances I add the material of the present invention to a brine, containing potent curing salt, of some one of the kinds which are used, in accordance with well known technique, in the corning of beef, the curing of hams, etc. Thus I am enabled to effect the tenderizing of the meats simultaneously with their corning or preservative cure.

Another satisfactory compound wherewith to accomplish the purposes of the present invention may be prepared by introducing proteolytic enzymes into a menstruum prepared as follows:

200 pounds of concentrated hydrochloric acid (approximately 25% solution) is added to:

(a) 100 pounds corn meal gluten (20% to 24% protein content); or
(b) 100 pounds wheat gluten (20% to 40% protein content); or
(c) 100 pounds soya bean cake (30% to 45% protein content).

The acidulated gluten is then refluxed, or otherwise heated, agitated and circulated, for approximately ten hours at a temperature of from 180° F. to 208° F. The product of the refluxing, or other heating, agitating and circulating operation,—being an aqueous menstruum containing, inter alia, a variety of amino acids,—is then passed through a filter or filters to remove all melanin and humous substances. The menstruum is now subjected to neutralizing treatment with sodium hydroxide until but very slightly acidulous to litmus. Next it is completely neutralized with sodium bicarbonate. Finally it is repeatedly filtered until it exhibits a light amber tint and no visible solids. In the final filtrate I have a saline menstruum into which the proteolytic enzymes are introduced.

In practice I prefer to dissolve approximately one (1) pound of papain in forty (40) pounds of a menstruum prepared as above described. Such menstruum, with its added proteolytic enzymes, may be applied to the meats to be tenderized, either by being brushed or rubbed onto the external surfaces of the meat, or by being injected into the meat, intravenously or otherwise. I find that the amino acid salts which are contained in such a menstruum exercise that control over the proteolytic enzymes which is necessary if the desirable meat tenderizing effect of the enzymes is to be realized without realizing concomitant disagreeable effects of the kind hereinbefore discussed.

The present invention contemplates that monosodium glutamate and other amino acid salts may be utilized to control the meat proteolysis effected by various enzymes (e. g., pepsin and the pancreatic enzymes as well as papain and other organic vegetable ferments derived from plants or the fruits thereof) which are employed to tenderize meats of various kinds.

What I claim as new and desire to secure by Letters Patent of the United States is:

1. A preparation wherewith to tenderize meat, comprising a proteolytic enzyme to which has been added a proteolysis inhibitor consisting of mono sodium glutamate.

2. A preparation to tenderize meat, comprising papain and mono sodium glutamate.

3. A controlled method of tenderizing meat which consists of subjecting it to the effects of proteolytic enzyme in the presence of the products of the acid hydrolysis of vegetable proteins.

4. A controlled method of tenderizing meat which consists of subjecting it to the effects of papain in the presence of mono sodium glutamate.

5. In a preparation wherewith to tenderize meat the combination of an agent for inducing proteolysis selected from the group consisting of papain, pepsin, and pancreatic enzyme, and an agent for inhibiting proteolysis beyond the desired stage of tenderness consisting of monosodium glutamate.

6. A proteolytic enzyme preparation wherewith to tenderize meat, consisting of a proteolytic enzyme and the products of the acid hydrolysis of vegetable proteins.

HUGH E. ALLEN.